(No Model.)
E. L. PHIPPS.
KNOB ATTACHMENT.
No. 273,763. Patented Mar. 13, 1883.
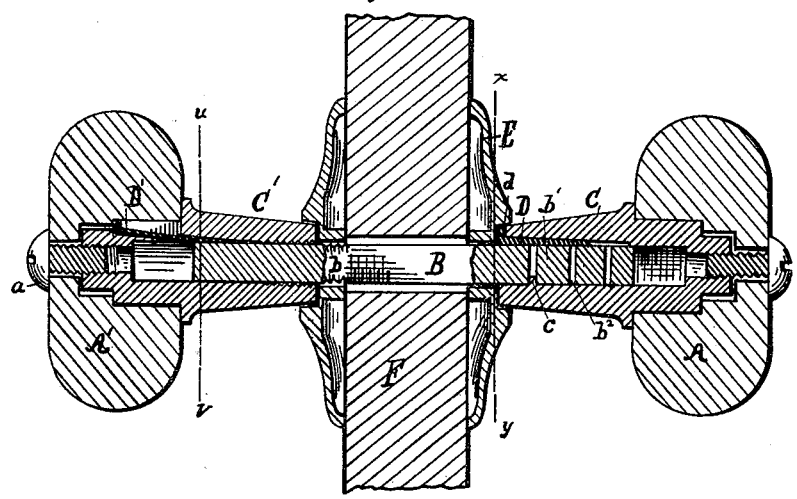
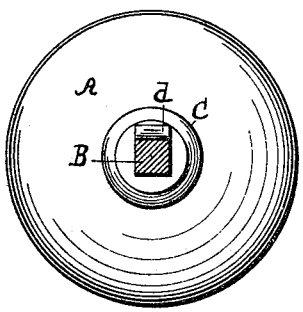
WITNESSES
Samuel E Thomas.
N. S. Wright.
INVENTOR
Edward L. Phipps
By W. W. Leggett.
Attorney

UNITED STATES PATENT OFFICE.

EDWARD L. PHIPPS, OF MILFORD, MICHIGAN.

KNOB ATTACHMENT.

SPECIFICATION forming part of Letters Patent No. 273,763, dated March 13, 1883.

Application filed October 31, 1882. (No model.)

*To all whom it may concern:*

Be it known that I, EDWARD L. PHIPPS, of Milford, county of Oakland, State of Michigan, have invented a new and useful Improvement in Door-Knobs; and I declare the following to be a full, clear, and exact description of the invention, such as will enable others skilled in the art to which it pertains to make and use it, reference being had to the accompanying drawings, which form a part of this specification.

My invention consists in the combinations of devices and appliances hereinafter specified, and more particularly pointed out in the claims.

In the drawings, Figure 1 is a longitudinal section of a door-knob embodying my invention. Fig. 2 is a cross-section along the line $u$ $v$. Fig. 3 is a cross-section along the line $x$ $y$, with the rose removed.

It is the object of my invention to provide an improved door-knob, and relates especially to the means of securing the shanks upon the spindle, so that they may be adjusted thereon as may be desired, and then effectually locked, the outer one in such a manner that the shank cannot be disengaged from the spindle until the inner shank is first unlocked. I accomplish this result, first, by providing the interior of the outer shank with a teat adapted to engage in a corresponding socket in the spindle when the spindle is inserted in the shank, the two being held firmly secured together by means of a locking-wedge inserted between the interior of the shank and the spindle; second, by providing the inner shank with a screw-cut connection with the spindle, whereby they may be adjusted as desired, the two being firmly held in place by a locking-wedge, whereby further turning is prevented.

In carrying out my invention A and A' represent the knobs.

B is an angular spindle, screw-cut on the corners on the inner end, $b$, and provided with suitable sockets in the other end, $b'$, as shown at $b^2$.

C is a shank adapted to be slipped upon the end $b'$ of the spindle, and provided on the interior with a teat, $c$, adapted to engage in the sockets $b^2$ of the spindle. The orifice of the shank is expanded somewhat along the end $b'$ of the spindle, as shown in the drawings, to enable the spindle to be inserted into the shank over the teat $c$, and also to provide a suitable space for the entrance of the wedge D, which is preferably constructed with an upturned end, $d$. I prefer to construct the shank with a shoulder adapted to receive the upturned end $d$ of the wedge, in order that the end of the shank may come suitably in contact with the rose E.

C' is a shank screw-cut on the interior, and adapted to be engaged upon the inner screw-cut end, $b$, of the spindle. Said shank is constructed with an interior orifice adapted for the insertion of a locking-wedge, D', between it and the spindle. I prefer that the end of said wedge should project, as shown in the drawings, so as to be secured from displacement by securing the knob over it as the knob is engaged upon the shank.

The operation of the device is as follows: The shank C is engaged upon the end $b'$ of the spindle, the teat $c$ engaging in one of the sockets $b^2$, as desired, when the wedge D is inserted in place, as above described, locking the shank upon the spindle. The spindle, with the knob A secured to the shank in any suitable manner, is then slipped through the door F, the inner end of the shank being brought into close contact with the rose E. The shank C' is then screwed upon the end $b'$ of the spindle to the desired length and the wedge D' inserted in place, as above described, locking said shank upon the spindle. The knob A' is then secured upon the shank in any proper manner, preferably by a screw, $a$, and the wedge D' is thereby secured from displacement. It is evident, since the latter adjustment is on the inner end of the spindle and the inner end of the outer shank is brought up snug against the rose, there is no possibility of removing the outer shank or of withdrawing the spindle from the outside of the door. Moreover, a very secure fastening is provided for the shanks at each end of the spindle. A door-knob so constructed is at once strong and durable.

What I claim is—

1. In a door-knob, the combination, with an angular spindle constructed with one or more sockets in the outer end, of a shank provided with an interior teat and adapted to be engaged upon said outer end of the spindle, and, in connection therewith, a locking-wedge, substantially as described.

2. In a door-knob, the combination of an angular spindle, B, screw-cut on the inner end, a shank, C', engaging the said end of the spindle, a wedge, D', locking the spindle and shank together and projecting from the shank, and a knob, A', independent of but detachably connected with the shank and covering the wedge to prevent its displacement, substantially as described.

In testimony whereof I sign this specification in the presence of two witnesses.

EDWARD L. PHIPPS.

Witnesses:
WALTER CRAWFORD,
MARY E. CRAWFORD.